(12) United States Patent
Oney

(10) Patent No.: US 7,486,859 B2
(45) Date of Patent: Feb. 3, 2009

(54) QUICK CONNECT LIGHTABLE ROD

(76) Inventor: Jeremy Jae Oney, 1725 Madrid Cir., Salinas, CA (US) 93906

( * ) Notice: Subject to any disclaimer, the term of this patent is extended or adjusted under 35 U.S.C. 154(b) by 150 days.

(21) Appl. No.: 11/409,812

(22) Filed: Apr. 24, 2006

(65) Prior Publication Data
US 2007/0274635 A1    Nov. 29, 2007

(51) Int. Cl.
   *G02B 6/26* (2006.01)
(52) U.S. Cl. .......................................... 385/39; 385/31
(58) Field of Classification Search ............... None
   See application file for complete search history.

(56) References Cited

U.S. PATENT DOCUMENTS 5,271,640 A * 12/1993 Potochick et al. ........... 280/816
5,493,480 A *  2/1996 Huang ....................... 362/102
5,826,966 A * 10/1998 Schwing .................... 362/505
7,018,081 B2 *  3/2006 Hopkins .................... 362/477
2002/0044452 A1 * 4/2002 Wang ......................... 362/528
2004/0027837 A1 *  2/2004 Hsu ............................ 362/551

* cited by examiner

*Primary Examiner*—Sung H Pak
(74) *Attorney, Agent, or Firm*—Raymond M. Galasso; Galasso & Associates, LP

(57) ABSTRACT

A lighted vehicle marker, light conducting rod or lightable rod with quick disconnect capabilities is disclosed herein. The lightable rod can have a hollow core and can be made from a translucent material. The lightable rod can have an integrated coupler that is connectable to a mating coupler, wherein the mating coupler can be secured to a vehicle by a mounting bracket. A light source can be secured within the mating coupler such that the light source can shine a light beam into a fiber optic member in the bore of the hollow translucent rod. The couplers can have a hollow core, wherein light from the light source can travel the length of the flexible light conducting rod and be emitted uniformly along the rod.

6 Claims, 1 Drawing Sheet

QUICK CONNECT LIGHTABLE ROD

FIELD OF THE DISCLOSURE

The present disclosure is generally related to lighting systems and more particularly to a lightable rod that can be efficiently connected to, and disconnected from a base that is mountable to a vehicle.

BACKGROUND

Off-road driving or "off-roading," as it is called by some, is a sport that continues to increase in popularity. Such a sport includes driving a vehicle, often a four wheel drive vehicle, over non-paved surfaces. Many off-road enthusiasts like to drive over rough terrain, through forests and between trees when their vehicles risk getting scratched, dented and stuck. Many different types of vehicles are utilized in off-roading, including four wheelers, Jeeps®, trucks, cars, dune buggies, recreational vehicles, sport utility vehicles, motorcycles, bicycles, scooters and even motor homes.

Wheeled vehicles come in many different configurations and since these vehicles often do not have to be "street legal" or comply with all of the government imposed safety requirements, some of these vehicles do not have lighting installed that complies with state or federal requirements. In fact, running lights on heavily used off road vehicles are often inoperable and may even be non-existent due to the harsh operating conditions encountered by the off-road vehicle.

With the growing popularity of off-roading, and the growing number of participants there is an ever increasing need for safety while driving off-road. One reason for additional safety measures is that "traffic laws" generally do not cover operation of vehicles operating off-road in open spaces. Due to the increase in accidents in off-roading many states have legislated new safety features for off road vehicles operating in state parks. One such law includes lightning requirements similar to those required on boats in the open water during the nighttime hours.

Boating is similar to off road vehicle operation because boating is conducted in wide open spaces without traffic lanes and without traffic control devices. Thus, one requirement for vehicles that are operated off-road, on government owned lands, is that of an "all-round" light is required by law. The all round light required is similar to the rear navigation light that is required for boats operating at night.

Some have tried utilizing boat navigation lights on off road vehicles with limited success. Traditional boat lights have a light bulb and a lens that is mounted atop a lightweight aluminum pole. The pole can have and electrical plug at the bottom of the pole and the pole can be inserted into a hole/receptacle in the boat. Such a pole can be easily bent and destroyed by tree limbs when a vehicle is driven off road. Further, the bulb and the lens at the tip of the pole can be easily broken. Additionally, the pole can vibrate out of the hole and fall out of the boat or off of the off-road vehicle. Accordingly, there is a need for an improved system and method for providing safety lights for boats and off-road vehicles.

SUMMARY OF THE DISCLOSURE

A quick connect lightable rod is disclosed that can be utilized to provide an indicator that a boat or vehicle is present in the dark and generally if the vehicle is moving. The quick connect lightable rod can have a sleeve and ball type coupler such as those utilized in high pressure air hoses that allows for the rod to quickly connected and disconnected to a boat or a vehicle without the need for tools. The light source for the lightable rod can be contained within the mounting portion of the system such that the light source stays protected.

DETAILED DESCRIPTION OF THE DRAWINGS

Figure 1:
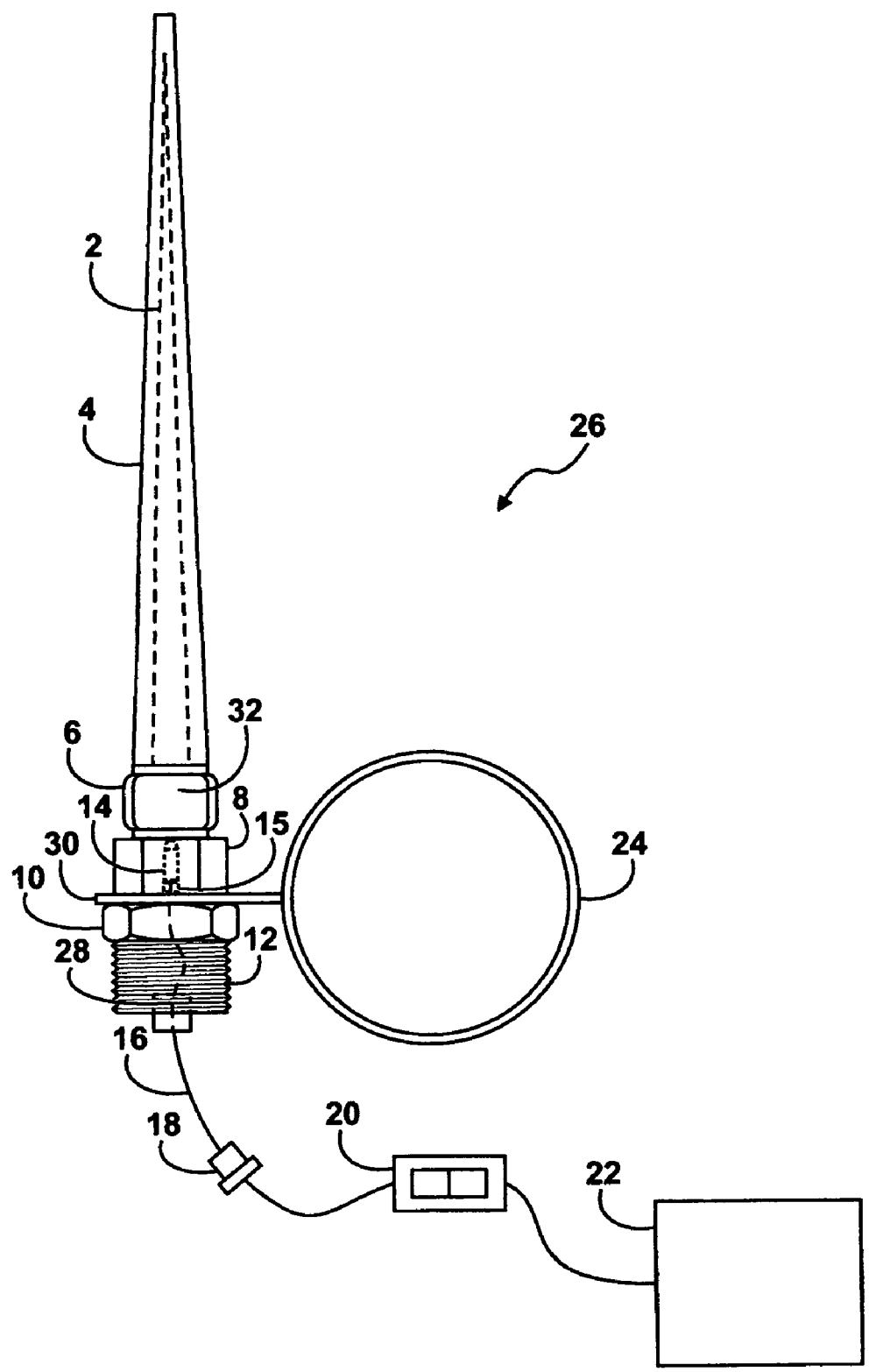
FIG. 1 is a side view of a quick connect lighting system mounted to a roll bar.

The following is a detailed description of novel embodiments depicted in the accompanying drawings. The embodiments are in such detail as to clearly communicate the subject matter. However, the amount of detail offered is not intended to limit anticipated variations of the described embodiments, but on the contrary, the claims and detailed description are to cover all modifications, equivalents, and alternatives falling within the spirit and scope of the present teachings as defined by the appended claims. The detailed descriptions below are designed to make such embodiments understandable to a person having ordinary skill in the art.

Generally, methods and arrangements for a light emitting system are provided. The light emitting system can have a base that holds a mounted coupler and a quick connect lightable rod that as a coupler for mating with the mounted coupler. The base and mounted coupler can be secured to a water vehicle or a wheeled vehicle. While specific embodiments will be described below with reference to particular configurations, those of skill in the art will realize that embodiments may advantageously be implemented in other substantially similar configurations.

The quick connect lightable rod can be utilized to provide an indicator that a boat or vehicle is present in the dark and further if the vehicle is underway. The quick connect lightable rod can have a sleeve and ball type coupler such as those utilized in high pressure air hoses that allows the rod to be quickly connected and disconnected to a boat or a vehicle without the need for tools.

In one embodiment the light emitting system can be utilized as a navigation light for boats and wheeled vehicles. The system can have a first hollow coupler that is securable to a mount. The mount can be adapted to secure the first hollow coupler to a vehicle such as a water vehicle of a wheeled vehicle. A light source can be secured within the first hollow coupler. A translucent rod can have a second hollow coupler wherein the coupler is adapted to engage the first hollow coupler such that the translucent rod can be secured to the vehicle. In one embodiment, the translucent rod is hollow and a fiber optic member can be inserted into the hollow core of the translucent rod. Thus, the light created by the light source can travel through the second hollow coupler and into fiber optic member where it can be radiated along the length of the translucent rod.

The first hollow coupler can be a spring loaded collar type coupler with captive balls wherein the captive balls. The captive balls can fit into a groove in the second hollow coupler when the collar is in its locking position to secure the first hollow coupler to the second hollow coupler. Alternately, the first hollow coupler can have the groove and the captive balls from the second coupler can fit into the groove of the first coupler to secure the translucent rod to the vehicle.

In another embodiment, the couplers can be threaded coupler such as a pipe nipple that has a hollow core. The light source can be a light emitting diode, a bulb that is filed with gas or a bulb that has a filament. The system can also include a switch coupled to the light source via a wire to connect and disconnect electrical power to the light source. The wire can be strain relieved to the first hollow coupler.

In another embodiment, a marker is provided that can be placed on a water vehicle or wheeled vehicle. The marker can include a first hollow coupler mountable on a vehicle and a light source secured to the first hollow coupler. The marker can further include a light conducting member having a second hollow coupler wherein the hollow coupler is engagable with the first hollow coupler. In operation the light source can project light into the light conducting member via the second hollow coupler.

A potting material can be utilized to secure the light source to the hollow coupler and a mounting bracket can be adapted to mount the first hollow coupler to the vehicle. The first hollow coupler can be made similar to, or like a coupler that is suitable for quick connect high pressure air hose, a hydraulic line or a water hose lines. In another embodiment the first hollow coupler and the second hollow coupler can be a threaded coupler.

In another embodiment a method of manufacturing a lightable rod system is provided. The method can include securing a wire to a connector adapted to accept a light emitting diode and potting the connector in a coupler, wherein the coupler can be adapter to accept a light emitting rod. The coupler can be fastened to a mounting bracket that in turn can be connected to a vehicle.

Referring to FIG. 1, a light emitting system 26 is disclosed that includes generally, a hollow rod 4 having a rod coupler 6 at one end. The rod 4 can have a fiber optic member 2 inserted into the bore of the rod 4. The system 26 further includes a base 8 having a base coupler 32, a light source 14 mounted in the base 8, a threaded portion 12, a strain relief 28 and a connector 15.

The base 8 can be mounted to mounting bracket 30 by inserting the threaded portion 12 through a hole in the mounting bracket 30 and securing nut 10 to the threaded portion 12 of the base 8. Mounting bracket 30 can be secured to a portion of a vehicle such as a boat or an off-road vehicle represented as roll bar 24 of an off-road vehicle. A cross section of the roll bar 24 is depicted to illustrate one way to attach the system 26 to a vehicle. However, other mounting systems that could mount the lighting system 26 to other portions of vehicles and/or to portions of a boat would not part from the scope of the present disclosure. For example the mounting bracket could be secured to a roof or a bumper of a vehicle or to a transom of a boat.

The light source 14, can be potted in the base 8 to secure the light source 14 to the base 8. Alternately, the light source 14 could be mounted or potted in the mount coupler 32. The light source 14 can take many forms such as a high intensity light emitting diode, a laser diode, an incandescent bulb, a florescent bulb, a bulb with a filament and even a bulb filled with a special gas. The light source 14 could produce electromagnetic energy in different parts of the visible and non-visible spectrum including at least portions of the infra-red and ultraviolet spectrum.

The light source 14 can direct a light beam through the base 8, through the mount coupler 32 and the rod coupler 6 and into the fiber optic member 2 such that the entire hollow rod 4 can be illuminated. The hollow rod 4 can be translucent member made from a clear or frosted material such as a polycarbonate or acrylic material.

The hollow rod 4 can have a hollow core and a fiber optic member 2 can be manufactured in, or inserted into the hollow core. The fiber optic member 2 can conduct light along its length and can refract light such that light is emitted along the length of the fiber optic member 2 and along the length of the rod 4.

The rod coupler 6 and the mount coupler 32 can be mating couplers that are similar to high pressure air type couplings. Such couplers can be hollow and allow light to pass through their center. One of the couplers can have a spring loaded sleeve that locks balls into a groove in the mating coupler. Such couplers are also commonly utilized to connect an air compressor to an air tool, high pressure power washing wands to pressure washers and to couple hydraulic systems together. Such couplers can allow for an easy connection and disconnection of the hollow rod 4 to a vehicle or a boat without the use of tools.

The lightable rod 4 can be made from a clear, frosted or translucent material such as a polycarbonate or acrylic material. The light from the light source 14 can be emitted by refraction and reflection provided by the fiber optic member 2 and the lightable rod 4. The light source 14 can radiate light such that it can be seen by other individuals and generally collisions and other dangers can be avoided.

In another embodiment, the couplers can be threaded couplers made from a pipe nipple and a threaded union. The rod coupler can have a gripping surface or "wings" to provide a grip for the user to spin the rod 4 in relation to the base 8. It can be appreciated that a quick connection and quick disconnection can be made between the hollow rod 4 and the base 8 without the need for tools and a robust connection can be achieved between the vehicle and the rod 4.

A wire 16 can be attached to the light source 14 via a connector 15 such that the light source 14 can be replaced if it quits emitting light or "burns out." The connector 15 can be potted in the base 8 such that the light source 14 can be inserted into, and removed from, the connector 15 when the light source 14 needs to be replaced or a different type of light is desired. For aesthetic effects, light sources having different colors and different intensities could be placed in the connector 15.

A strain relief 28 can also be potted in the base 8 to increase the robustness of the wired connection. A second connector 18 could also be utilized to connect and disconnect the power within the system 26. An on/off switch 20 could interconnect the light source 14 to a power source 22 such as a battery.

During manufacturing, the mounting bracket 30 can have a hole punched through it and the coupler the threaded portion 12 of the base 8 can inserted into the punched hole and secured on a back side by nut 30. The mounting bracket 30 could wrap around a bar such as a roll bar 24 utilizing a clamping system.

As stated above, the coupler 6 in the lightable rod 4 can mate with mating coupler 32 such that the removable lightable rod 4 has no active components and can be quickly attach to, and detached from, a land, air or ground based vehicle. In fact, the lightable rod can be handled roughly when it is removed without compromising the integrity of the light source 14. It can be appreciated that the light source 14 can be placed in the mount coupler 32, and the mount coupler 32 can be located on a vehicle or a boat such that it has a low profile, wherein, when the lightable rod 4 is removed, there is little chance of the mounting coupler 32 and the light source 14 being hit by passing objects such as tree branches and ultimately being broken. Further, the light source 14 can be hermetically sealed within the coupler 32 or covered with a rain cover such that the light source 14 is not exposed to the elements when the rod 4 is removed.

In one embodiment the light along the length of the lightable rod 4 can be suppressed by the fiber optic member or a tubular mirror and a translucent portion of the rod 4 can be occur at the tip or at the end of the rod 4. This configuration would be desirable for a boating application where the light refracted out of the end of the rod 4 can act as a point source such as required by a navigation lighting requirements.

In another embodiment, the rod 4 can be removed and a long flexible fiber optic member 32 having a diameter of three eights of an inch can be connected to the mounting coupler 32. The fiber optic member 2 can be utilized as an emergency lighting source much like a flashlight. In such a configuration light from the light source 14 will be emitted from the end of the fiber optic member 2. The unconnected end of the fiber optic member 2 can be pointed at an area, and correspondingly the area can be lit by the light that is directed by the orientation of the end of the fiber optic member 2.

In another embodiment, the lightable rod or the couplers 6 and 32 can be mounted on a spring loaded pivot similar how vehicular antenna systems are mounted such that the lightable rod pivot when hit and thus can resist breaking when the rod 4 comes into contact with a tree branch. Further, the rod 4 can be disconnected from the mounted coupler 32 without the need for tools and the rod 4 can be stored when lighting is not required. For example, during the day or when the vehicle is not being operated on a street or highway the rod 4 can be easily disconnected and stored.

The above disclosed subject matter is to be considered illustrative, and not restrictive, and the appended claims are intended to cover all such modifications, enhancements, and other embodiments which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A lighting system comprising:
    a base operable to be secured to a mounting bracket and said mounting bracket operable to be secured to a vehicle;
    a light source securable and hermetically sealed within a bore of the base;
    a wire coupled to a connector and operable to provide power to the light source; said connector potted within the base
    a first hollow coupler secured to the base;
    a second hollow coupler operable to mate with the first hollow coupler; said second hollow coupler comprising a grip for disconnecting said second hollow coupler from said first hollow coupler;
    a hollow translucent rod removably secured to the second hollow coupler; said hollow translucent rod operable to refract light along the entire length of the removable hollow translucent rod; and
    a fiber optic member insertable into the removable hollow translucent rod wherein light that is created by the light source can travel through the first hollow coupler and the second hollow coupler and into the fiber optic member and radiate from the sides of the removable hollow translucent rod.

2. The lighting system of claim 1 wherein the first coupler is a threaded coupler.

3. The lighting system of claim 1 wherein the light source comprises a light emitting diode.

4. The lighting system of claim 1 further comprising a switch coupled to the light source.

5. The lighting system of claim 1 further comprising a strain relief coupling the wire to the first hollow coupler.

6. The lightable device of claim 1 wherein the first hollow coupler comprises an air hose coupler.

* * * * *